2 Sheets—Sheet 1.
J. F. BUSEY.
Dies for Welding Chain-Links.
No. 219,215. Patented Sept. 2, 1879.
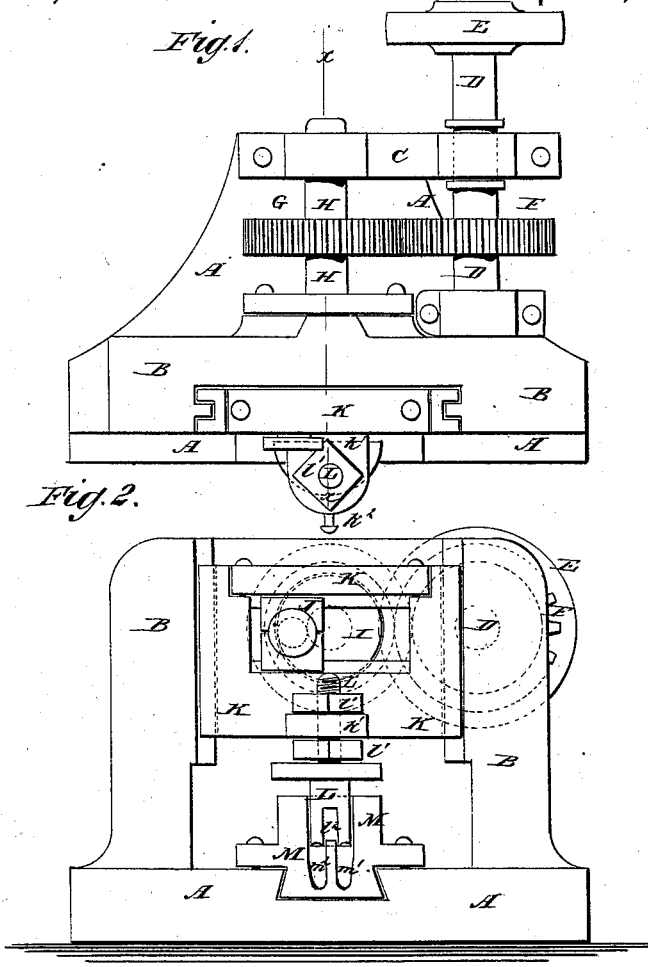
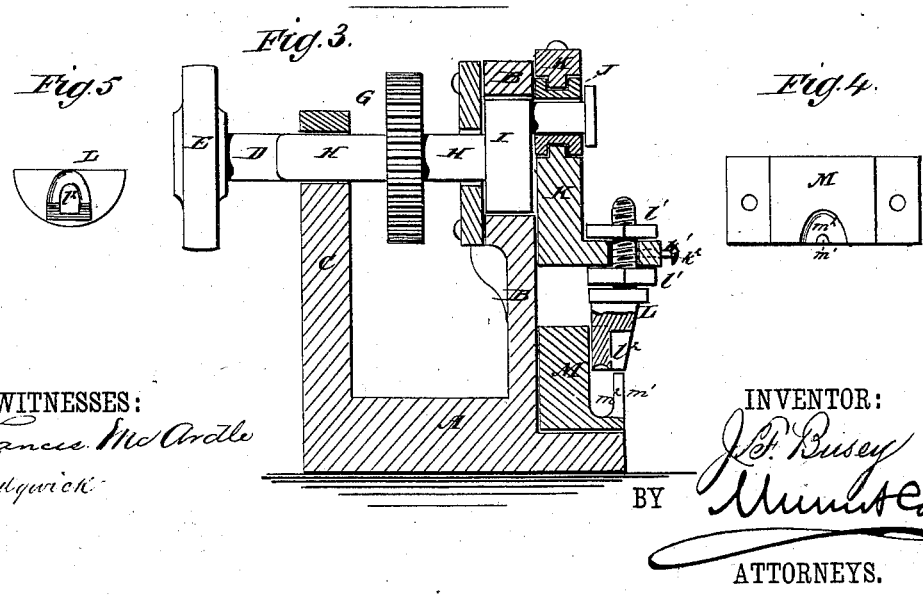
WITNESSES:
Francis McArdle
C. Sedgwick
INVENTOR:
J. F. Busey
BY
Munn & Co
ATTORNEYS.

J. F. BUSEY.
Dies for Welding Chain-Links.

No. 219,215. Patented Sept. 2, 1879.

UNITED STATES PATENT OFFICE.

JEROME F. BUSEY, OF BECK'S MILLS, PENNSYLVANIA.

IMPROVEMENT IN DIES FOR WELDING CHAIN-LINKS.

Specification forming part of Letters Patent No. 219,215, dated September 2, 1879; application filed November 2, 1878.

*To all whom it may concern:*

Be it known that I, JEROME F. BUSEY, of Beck's Mills, in the county of Washington and State of Pennsylvania, have invented a new and useful Improvement in Machines for Welding Chain-Links, of which the following is a specification.

Figure 6:
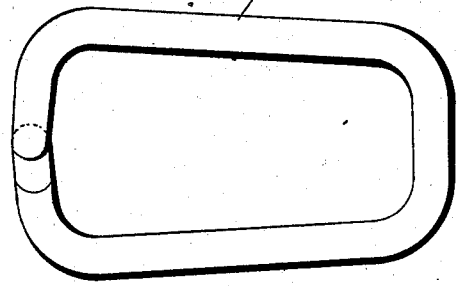
Figure 7:
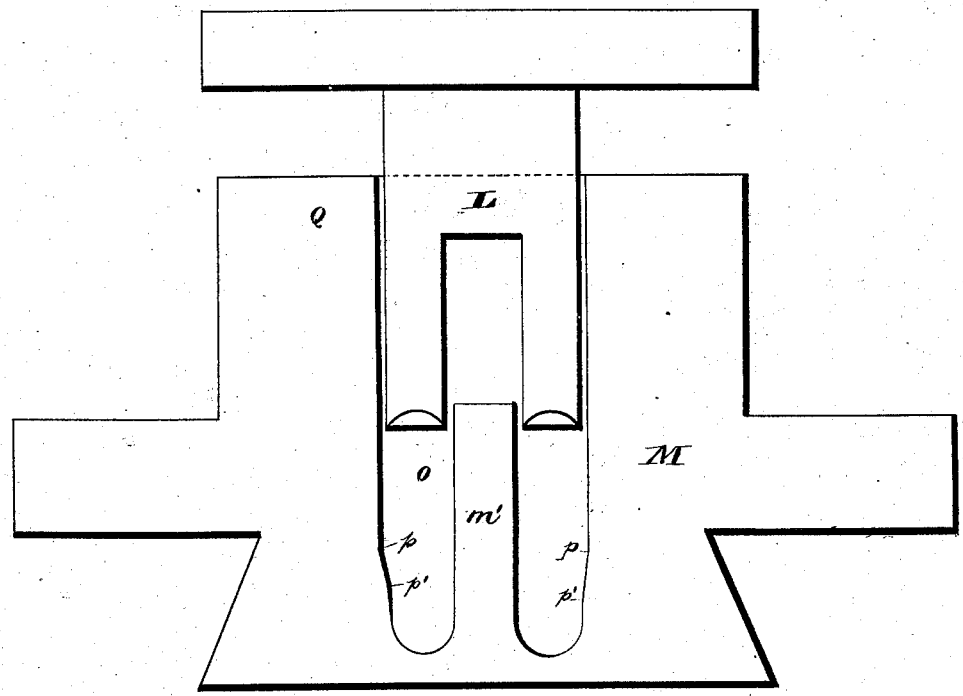

Figure 1 is a top view of my improved machine. Fig. 2 is a front view of the same. Fig. 3 is a vertical section of the same, taken through the line $x$, Fig. 1. Fig. 4 is a face or top view of the lower die. Fig. 5 is a face or bottom view of the upper die. Fig. 6 is a plan view of the link-blank before it has been welded. Fig. 7 is an enlarged view of the upper and lower dies.

Similar letters of reference indicate corresponding parts.

The object of this invention is to furnish an improved machine for welding chain-links after they have been bent into proper shape, and which shall be simple in construction, convenient in use, and effective in operation, welding the ends firmly, and bringing the welded end of the link into and leaving it in the desired shape.

The invention consists in the dies for forming the weld in the links of the particular form and construction hereinafter specified, and pointed out in the claim, and also in certain combinations of parts, as will be described, and referred to in the claim.

A represents the bed-plate or base of the machine; B, the front upright frame, and C the rear upright.

D is the driving-shaft, which revolves in bearings attached to the upright frames B C, and to its rear end is attached a pulley, E, to receive the driving-belt. To the shaft D, between the frames B C, is attached a gear-wheel, F, the teeth of which mesh into the teeth of the gear-wheel G, attached to the shaft H. The shaft H revolves in bearings attached to the frames B C, and to its forward end, within the frame B, is attached a crank or crank-wheel, I, the crank-pin of which works in a bearing-block, J. The bearing-block J slides in a cross-slot in the upper or rear part of the gate K, and is tongued and grooved to said gate to keep it in place. The gate K slides up and down, or forward and back, in a recess in the frame B, and is tongued and grooved to said frame to keep it in place.

Upon the forward side of the lower or forward part of the gate K is formed, or to it is rigidly attached, a lug, $k^1$, which is perforated to receive the shank of the upper or movable die, L. The die L is secured to the lug $k^1$ by two nuts, $l^1$, screwed upon it, one upon each side of the said lug, as shown in Figs. 2 and 3, so that by adjusting the said nuts $l^1$ the die L may be adjusted to operate upon thicker or thinner links. The die L may be further secured in place by a set-screw, $k^2$, which passes in through the lug $k^1$ and rests against the shank of the said die L.

The face of the die L is made in the shape of a half-circle or oval, or in the required shape of the end part of a link, and is grooved, as shown in Figs. 2, 3, and 5, to bring the welded end of the link to the required shape. In the forward or flat side of the die L is formed a longitudinal groove, $l^2$, to receive the pin $m^1$ of the lower or stationary die, M. The lower part of the base of the die M is made in dovetailed form, and is inserted in a dovetailed notch in the upper forward part of the bed-plate or base A. The end parts of the die M overlap and are bolted to the top of the base A. In the outer or inner side of the lower die, M, is formed a semi-cylindrical or oval groove, $m^2$, extending from the top of the said die nearly to its bottom, and having an upwardly-projecting pin or core, $m^1$, in the central part of its lower or inner end. The bottom or end of the groove $m^2$, around the core or pin $m^1$, is concaved to give the required shape to the welded end of the link.

The sides of the lower part of the groove $m^2$, upon the opposite sides of the pin $m^1$, are inclined inward to press the sides of the link toward each other as the said link is forced downward to the bottom of the said groove, and thus make a heavy lap or large weld.

In using the machine the links are bent in my improved bending-machine, or by any other suitable means, and are then heated and their overlapped ends are placed in the groove $m^2$ around the pin $m^1$, where they are welded and brought into proper shape by the descent of the die L. As the die L again ascends, the welded link is lifted off over the top of the pin $m^1$.

The rear wall, $o$, of the lower die, M, is vertical, and serves as a rear guide for the upper die, L. The side walls of the lower die are vertical from the point $p$ to the upper face of the die, while that portion of the sides from the point $p'$, which is the upper part of the concave portion of the die, to the point $p$ inclines inwardly, whereby the links when inserted in the lower die and subjected to the action of the upper die are not expanded or contracted in length, but, on the other hand, are contracted in width by means of the inclined portions of the die, and thus the ends are caused to overlap each other to the desired extent when the link-blank has been forced down snugly into the concave groove in the lower die.

The lower and fixed die, M, extends upwardly at Q, to form a guide for the upper movable die and retain the same in a vertical position. As the sides of the upper die do not fit snugly against the sides of the upper portion of the lower die, owing to the fact that the upper die must descend into the inwardly-inclined portion of the lower die, the pin $m^1$ serves as a guide to prevent any forward or lateral displacement of the upper die.

Having thus described my invention, I claim as new and desire to secure by Letters Patent—

In a chain-link-welding machine, the combination, with the movable upper die, formed with an open vertical groove in its front face and with an oval groove in its end, of the lower stationary die, M, constructed to extend upwardly to form a rear guide for the movable die, and provided with an oval groove in its lower portion, with inwardly-inclined side walls, which merge into said oval groove, and with a pin, $m^1$, substantially as set forth.

JEROME F. BUSEY.

Witnesses:
  J. G. F. CAMPBELL,
  WM. B. STEWART.